R. E. DODGE & A. S. PATTON.
CENTERING DEVICE.
APPLICATION FILED MAY 11, 1907.

921,521.

Patented May 11, 1909.

Inventors
Ralph E. Dodge
and Alfred S. Patton

Witnesses

By Geo. S. Vashon
Attorney

UNITED STATES PATENT OFFICE.

RALPH E. DODGE, OF LEBAM, AND ALFRED S. PATTON, OF FRANCES, WASHINGTON.

CENTERING DEVICE.

No. 921,521.   Specification of Letters Patent.   Patented May 11, 1909.

Application filed May 11, 1907, Serial No. 373,104.

*To all whom it may concern:*

Be it known that we, RALPH E. DODGE and ALFRED S. PATTON, citizens of the United States, residing at Lebam and Frances, respectively, in the county of Pacific and State of Washington, have invented new and useful Improvements in Centering Devices, of which the following is a specification.

This invention relates to centering devices for use on lathe carriages to support the work being centered, and has for its objects to provide a comparatively simple, inexpensive device of this character which may be readily installed for use on the lathe, whereby the work will be properly supported and which will permit of ready vertical and lateral adjustment of the work to permit of its proper engagement with the centering posts.

A further object of the invention is to provide a device of the type described which when the work has been brought to proper position may be readily locked during manipulation of the lathe centers, and in which the centering device may after the work has been properly engaged in the lathe be conveniently released and moved to an unobstructing position, while the work is being turned.

With these and other objects in view, the invention comprises the novel features of construction and combination of parts more fully hereinafter described and claimed.

Figure 1:
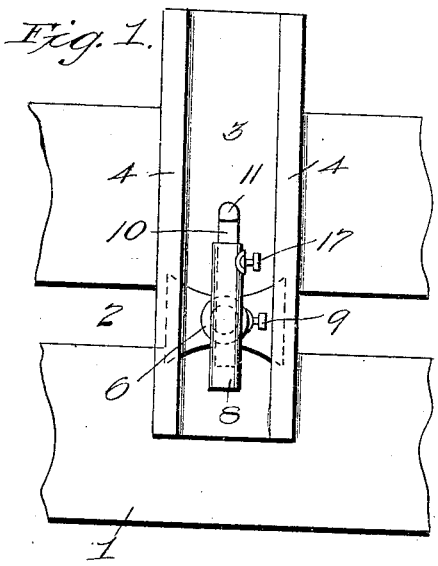
Figure 2:
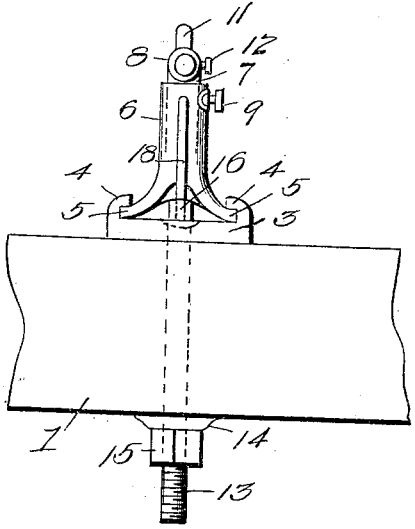
Figure 3:
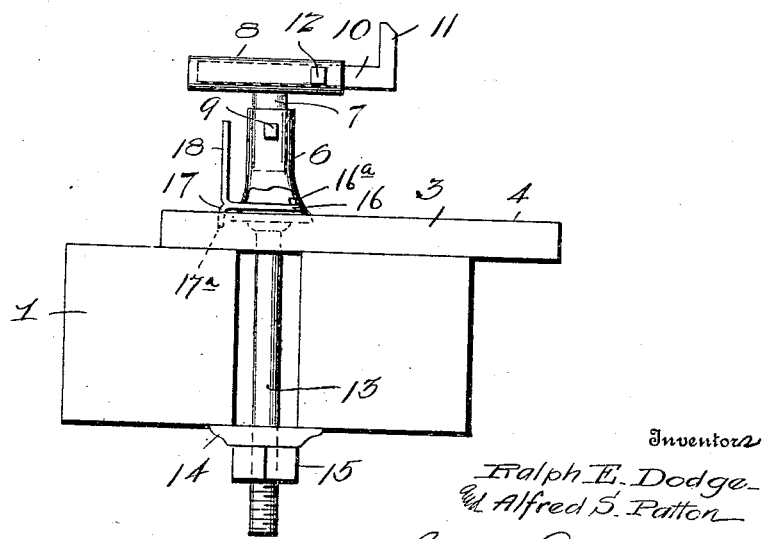

In the accompanying drawings, Figure 1 is a top plan view of a work support embodying the invention and showing a portion of the lathe bed to which it is attached. Fig. 2 is a front end view of the same. Fig. 3 is a side elevation partly in section.

Referring to the drawings, 1 designates the lathe bed of the usual form having a longitudinal opening or slot 2.

The work support embodying the invention and of which two will in practice be employed comprises a base plate 3 extended transversely of the bed 1 and projecting at one end beyond one side thereof, said base being provided with a pair of longitudinal under-cut guide flanges 4 adapted to receive beneath them up-turned engaging portions or ears 5 formed on the lower end of a tubular post 6 in which is telescopically arranged for vertical adjustment the depending stem portion 7 of a T-shaped work supporting member, the cross bar or head 8 of which is of tubular form.

Tapped through the post 6 is a set screw 9 by means of which the supporting member may be fixed in adjusted position, while slidably and telescopically arranged in the tubular cross head 8 is a gage member or arm 10 having at its outer end a vertically uprising portion or finger 11 designed for engagement with the work to be supported, there being tapped through the head 8 a set screw 12 for fixing the gage arm 10 in adjusted positions.

Extended vertically through the slot 2 is a bolt 13 having at its upper end a head which is sunken into the base plate 3, and arranged on the bolt and to bear beneath the lower face of the carriage 1 is a washer 14 held in place by a nut 15 threaded onto the bolt, which latter serves for adjustably fixing the base or guide plate 3 in position on the lathe bed, while the post 6 is in turn adjustably fixed on the guide plate by means of a spring locking member secured beneath the post between the engaging ears 5 and having an arm 16 bolted at 16ª to the post, a down-turned toe 17 that engages a socket 17ª in the base plate 3, and an uprising handle 18.

In practice, a pair of the supporting devices are arranged respectively adjacent the head and tail stocks of the lathe and the work to be centered is arranged in position on the supporting heads 8, after which the heads are adjusted vertically by loosening the screws 9, thus bringing the work to the proper height and the hand lever 18 is manipulated for disengaging the toe 17 of the locking member from the socket of the base member 3, thus permitting movement of the post 6 and parts carried thereby in a direction transversely of the lathe bed to effect a horizontal adjustment of the work.

During movement of the support for effecting transverse adjustment of the work, the latter is caused to move with the support, owing to engagement of the fingers 11 with the side of the work, it being noted that by loosening the screw 12 and moving the gage arm 10 longitudinally relative to the head 8 the support may be adjusted for accommodating pieces of work of varying widths. After the work has been properly centered and engaged by the centering pins of the lathe the supporting device may by manipulating the handle 18 to operate the lock 16 be moved outward to the end of the base plate 3, thus to occupy an unobstructing position out of the way of the work being turned.

It is to be particularly noted that the improved device provides for effectually supporting the work and shifting the same during the centering operation and that the adjustment of the various parts of the device necessary to the proper handling of the work may be conveniently effected.

What we claim is:

1. In a device of the character described, a base plate having a movable connection with a lathe bed and being provided with a socket, a standard slidably mounted on said base plate, a locking finger carried by said standard and adapted to engage with the socket in the base plate to retain the former in fixed relation thereto, and a work supporting arm carried by said standard.

2. In a device of the character described, a base plate carried by a lathe bed and being provided with holding and guiding means and also with a socket, a standard mounted on said base plate and engaging the said holding and guiding means thereon, a locking finger carried by said standard and engaging with the socket in the base plate to retain said standard in a fixed position thereon, and a work supporting arm carried by said standard.

3. In a device of the character described, a base plate carried by a lathe bed and being provided with a socket, a standard slidably mounted on said base plate, a spring locking finger carried by said standard and provided with a detaching handle, said finger being adapted to engage with the socket in the base plate to normally retain the standard in a fixed relation thereto, and a work supporting arm carried by said standard.

In testimony whereof, we affix our signatures in presence of two witnesses.

RALPH E. DODGE.
ALFRED S. PATTON.

Witnesses:
   MAURICE E. DODGE,
   CEMENTHA E. DODGE.